United States Patent [19]
Park et al.

[11] Patent Number: 5,459,578
[45] Date of Patent: Oct. 17, 1995

[54] METHOD AND APPARATUS FOR MEASURING TWO DIMENSIONAL PLANE DISPLACEMENT BY MOIRE FRINGES OF CONCENTRIC CIRCLE GRATINGS

[75] Inventors: Yoon C. Park; Seung W. Kim, both of Daejon, Rep. of Korea

[73] Assignee: Korea Telecommunication Authority, Seoul, Rep. of Korea

[21] Appl. No.: 243,800

[22] Filed: May 17, 1994

[30] Foreign Application Priority Data

Dec. 22, 1993 [KR] Rep. of Korea .................. 1993-29162

[51] Int. Cl.$^6$ .................................................. G01B 11/00
[52] U.S. Cl. ........................................ 356/374; 250/237 G
[58] Field of Search .................................. 356/373, 374, 356/399, 400; 250/237 G

[56] References Cited

U.S. PATENT DOCUMENTS 3,689,162  9/1972  Ferguson .................................. 356/374

*Primary Examiner*—F. L. Evans
*Attorney, Agent, or Firm*—Spencer, Frank & Schneider

[57] ABSTRACT

The present invention provides an apparatus and method for measuring two- dimensional displacement by moire fringes of concentric circle gratings which two-dimensional displacement can be precisely measured by a pair of grating and the measurement resolution can be improved by the image processing using the characteristics of moire fringes without noises.

2 Claims, 15 Drawing Sheets

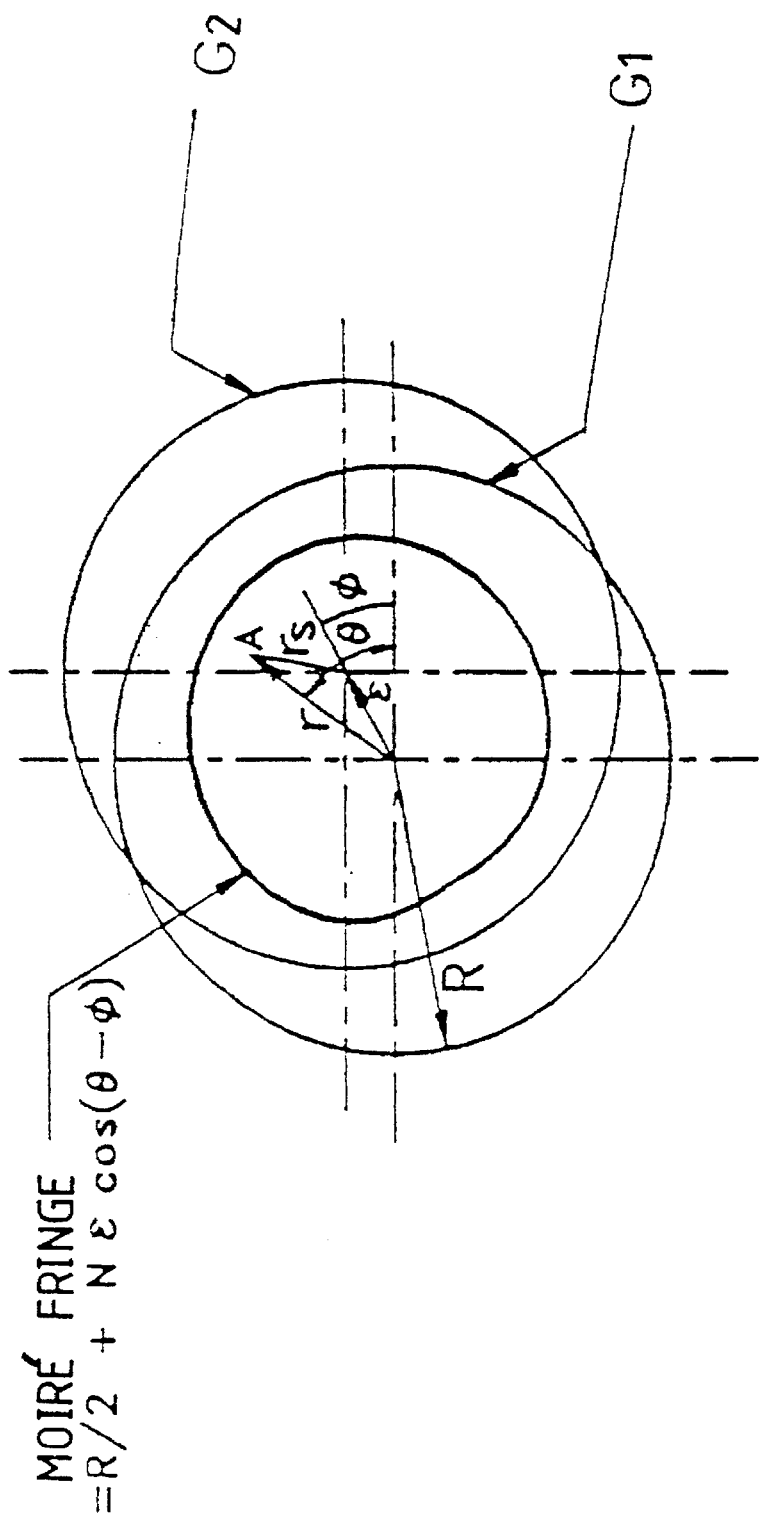

FIG. 3
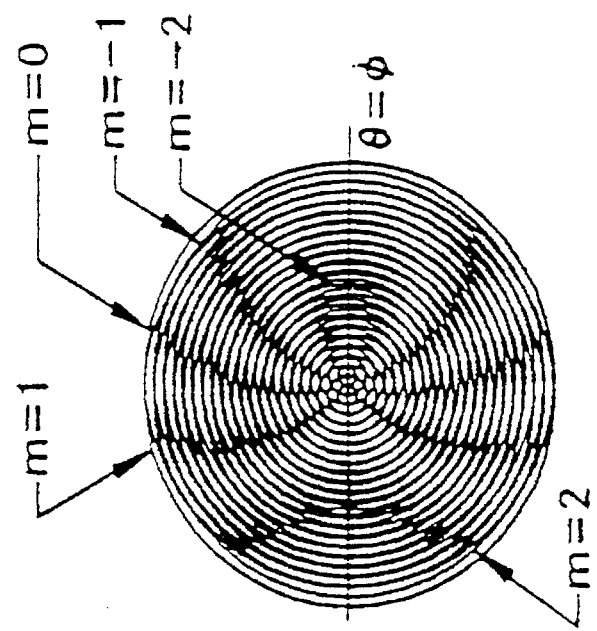
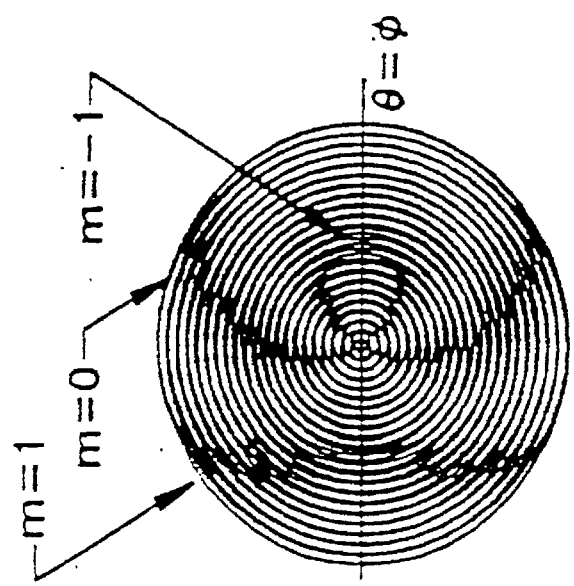
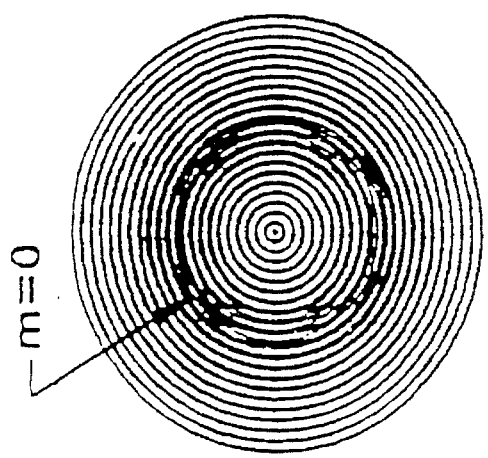

METHOD AND APPARATUS FOR MEASURING TWO DIMENSIONAL PLANE DISPLACEMENT BY MOIRE FRINGES OF CONCENTRIC CIRCLE GRATINGS

BACKGROUND OF THE INVENTION

The present invention relates to measurement of two dimensional plane displacement, and more particularly to a method and apparatus for precisely measuring two dimensional plane displacement using moire fringes of concentric circle gratings.

In principle, a pair of optical gratings having fine periodic or quasi-periodic grids produce moire fringes of a high visibility when the pair of optical gratings are overlapped. The moire fringes have a frequency equivalent to a difference of spatial frequency between the optical gratings and are sensitively changed according to the relative one- or two- dimensional plane displacement induced between gratings.

Recently, with increasing demands on precise alignment between the pattern master and wafer for integrated circuits fabrication, much attention has been devoted to the measurement of the plane displacement. So, it has previously been proposed to provide an optical linear scale for measuring one dimensional displacement or to provide a rotary encoder for measuring rotational angle.

However, there is a problem that the optical linear scale or the rotary encoder cannot precisely measure the one-dimensional displacement of a body.

Accordingly, it is an object of the present invention to solve the above mentioned problem.

It is a purpose of the present invention to provide a method for precisely measuring the relative two- dimensional plane displacement of a moving body by forming moire fringes induced between two concentric circle gratings each having a different pitch.

It is another purpose of the present invention to provide an apparatus for precisely measuring the relative two- dimensional plane displacement of the body by processing an image of moire fringes induced between two concentric circle gratings each having a different pitch.

SUMMARY OF THE INVENTION

A method and apparatus for precisely measuring two dimensional plane displacement by moire fringes of concentric circle gratings are defined by the present invention.

The invention relates to an apparatus for measuring two-dimensional displacement by moire fringes of concentric circle gratings comprising: a heat absorbing filter absorbing heat of a beam from a light source, an optical fiber transmitting the beam from the heat absorbing filter, a condensing lens condensing the beam from the optical fiber, a beam spliter reflect the beam through the condensing lens and changing a path of the beam into the 90 direction, a microscope lens condensing the beam from the beam spliter, a moving grating of a moving body being shone by the beam the microscope lens, a standard grating forming a real image of the moving grating on itself through the microscope lens and forming a pattern of moire fringes together with the real image of the moving grating, a photographing means capturing a virtual image of the moving grating and the standard grating.

Also, the invention relates to a method for measuring two-dimensional displacement by moire fringes of concentric circle gratings comprising: steps for absorbing a beam of a light source by a heat absorbing filter and thereafter transmitting the beam through an optical fiber, condensing the beam from the optical fiber and thereafter transmitting the beam reflected by the beam splitter a microscope objective, shining the beam through the microscope objective on a moving grating of a moving body, forming an image of the moving grating on the standard grating through the microscope objective, and capturing an overlapped virtual image of the moving grating and the standard by a photographing means.

BRIEF DESCRIPTION OF THE INVENTION

For understanding of the nature and objects of the invention, reference should be had to the following detailed description taken in conjunction with the accompanying drawings in which;

FIG. 2 illustrates a plane view of a generating location of moire fringes according to a relative displacement of a standard grating and a moving grating.

FIG. 3 illustrates a plane view of representative patterns of moire fringes according to a relative displacement of a standard grating and a moving grating.

DETAILED DESCRIPTION

Figure 1C:
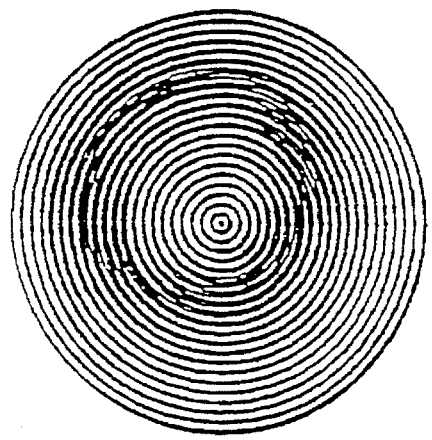
FIG. 1C illustrates a plane view of moire fringes induced between a standard grating and a moving grating.
Figure 1B:
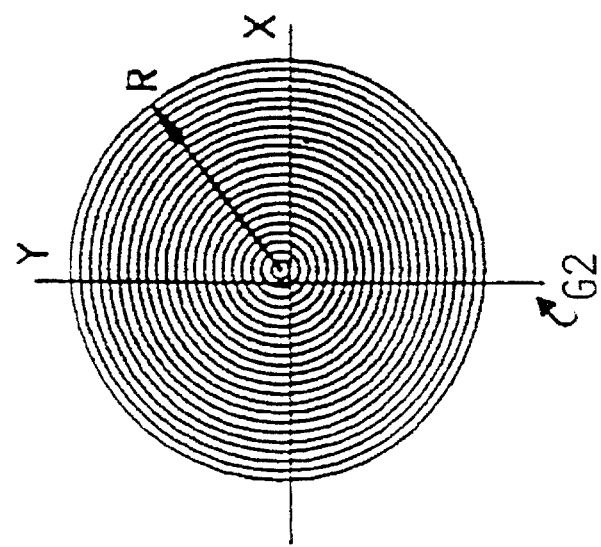
FIG. 1B illustrates a plane view of a moving grating G2 having a diameter R and having N circles.
Figure 1A:
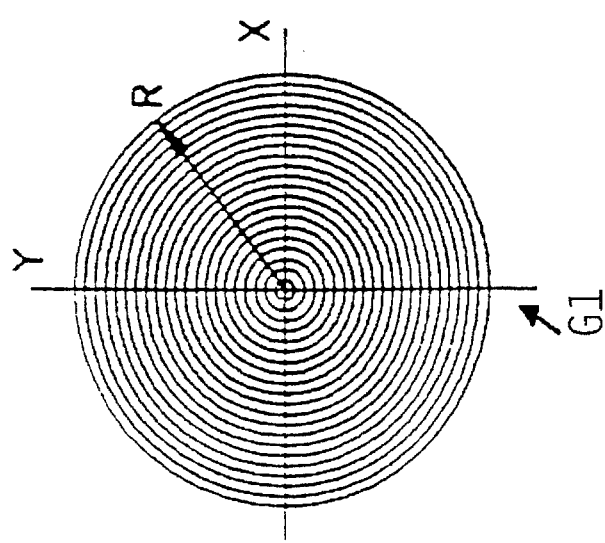
FIG. 1A illustrates a plane view of a standard grating G1 having a diameter R and having N-1 circles.

Referring to FIG. 1A, a standard grating G1 has a diameter R and consists of N-1 concentric circles being equally spaced, that is R/(N-1). The standard grating is fixed on a stationary frame and its center is established as an origin of measurement for a moving body.

A moving grating G2 has a diameter R and consists of N concentric circles being equally spaced, that is R/N. The moving grating is fixed on the moving body. Moire fringes are generated as shown by FIG. 1C when the two gratings are overlapped.

The relationship between a generating location of moire fringe and a relative location of two gratings is as follows. The transmittance of the grating G1 can be expressed in terms of (r, θ) polar coordinates and a sinusoidal function as $$S_1 = \frac{1}{2}\left(1 + \cos\frac{2\pi(N-1)}{R}r\right) \quad (1)$$

Similarly, the transmittance of the grating G2 may also be written as $$S_2 = \frac{1}{2}\left(1 + \cos\frac{2\pi N}{R}r_s\right) \quad (2)$$

in which $r_s$ represents the distance measured from the center of the grating G2. As shown by FIG. 2, the two-dimensional displacement of the moving grating with respect to the standard grating may be defined by an eccentric magnitude $\epsilon$ and an eccentric $\phi$ of the moving body. Then, the relationship between r in Eq. 1 and $r_s$ in Eq. 2 may be expressed as $$\begin{aligned}r_s^2 &= r^2 + \epsilon^2 - 2r\epsilon\cos(\theta - \phi) \\ &= [r - \epsilon\cos(\theta - \phi)]^2 + \epsilon^2\sin^2(\theta - \phi)\end{aligned} \quad (3)$$

The eccentric magnitude $\epsilon$ may be assumed small enough that its squared term in Eq. 3 can be neglected, that is, $$r_3 = r - \epsilon\cos(\theta - \phi) \quad (4)$$

Now the standard grating and the moving grating are overlapped and illuminated by a parallel beam having a mean intensity $I_o$. Then the overall intensity distribution transmitted is determined by $$I = I_o \times S_2 \times S_1 \quad (5)$$

By substituting Eqs. 1, 2 and 5 into Eq. 6 and further by introducing two normalized parameters, $r_o$ (= r/R) and $\epsilon_o$ (=$\epsilon$/R), Eq. 5 can be obtained in four separated harmonic terms as $$I(r_o, \theta) = \frac{I_o}{4} + \frac{I_o}{4}\cos[2\pi N(r_o - \epsilon_o\cos(\theta - \phi))] + \quad (6)$$

$$\frac{I_o}{4}\cos[2\pi(N-1)r_o] +$$

$$\frac{I_o}{8}\cos[2\pi((N-1)r_o - \epsilon_o N\cos(\theta - \phi))] +$$

$$\frac{I_o}{8}\cos[2\pi(r_o - \epsilon_o N\cos(\theta - \phi))]$$

The second term and the third term are a harmonic function representing the intensity of the parallel beam which reflects the individual effects of the standard grating having the radial frequency N-1 and the moving grating having the radial frequency N, respectively. The fourth term is a harmonic function representing the summing interference having the radial frequency of (2N-1). The fifth term is a harmonic function representing the differential interference whose frequency equals unity, that is, the difference of the radial frequencies between the standard grating and the moving grating. Moire fringes are in fact modulated to this lowest frequency, that is, the difference of radial frequencies between two gratings and can be extracted in the normalized form of $$I_m(r_o, \theta) = \cos[2\pi(r_o - \epsilon_o N\cos(\theta - \phi))] \quad (7)$$

As shown in the above equation, the eccentric magnitude $\epsilon_o$ and the eccentric direction $\phi$ of the moving grating G2 are expressed as a phase delay term for the radial direction of moire fringe. Therefore, the radial phase of moire fringes $\psi(\theta)$ may be expressed as $$\psi(\theta) = 2\pi\epsilon_o N\cos(\theta - \phi) \quad (8)$$

Also, the darkest centers of moire fringes can be traced from Eq. 7 by the following condition:

$$I_m(r_o, \theta) = \cos[2\pi r_o - \psi(\theta)] = -1 \quad (9)$$

The integer m (0, ±1, ±2, ±3, . . . ) is defined as the fringe order. Therefore, the centers of moire fringe are determined by $$r_o = \frac{1}{2} + m + \frac{\psi(\theta)}{2\pi} \quad (10)$$

FIG. 3 illustrates some representative moire fringe patterns according to the eccentric magnitude $\epsilon$. The moire fringes are symmetrically generated to the eccentric direction ($\theta = \phi$) of the moving grating G2. The magnifying ratio for the eccentric magnitude of the moire fringes according to the displacement of the moving grating G2 can be obtained by $$\frac{r_o}{\epsilon_o} = N, \quad \text{for } \theta = \phi \quad (11)$$

Therefore, the eccentric magnitude of moire fringe is N, that is, the number of the concentric circles, multiplied by the real displacement of the moving grating. By sampling the intensity distribution of the parallel beam from $r_o$=0 to $r_o$=1 obtained by the moire fringes, the phase of one periodic component is calculated and the radial phase is calculated and obtained. Also, in the distribution of the radial phase from θ=0° to θ=360°, the phase of one periodic component represents the eccentric direction of the moving grating, and an amplitude represents the eccentric magnitude of the moving grating.

Figure 4:
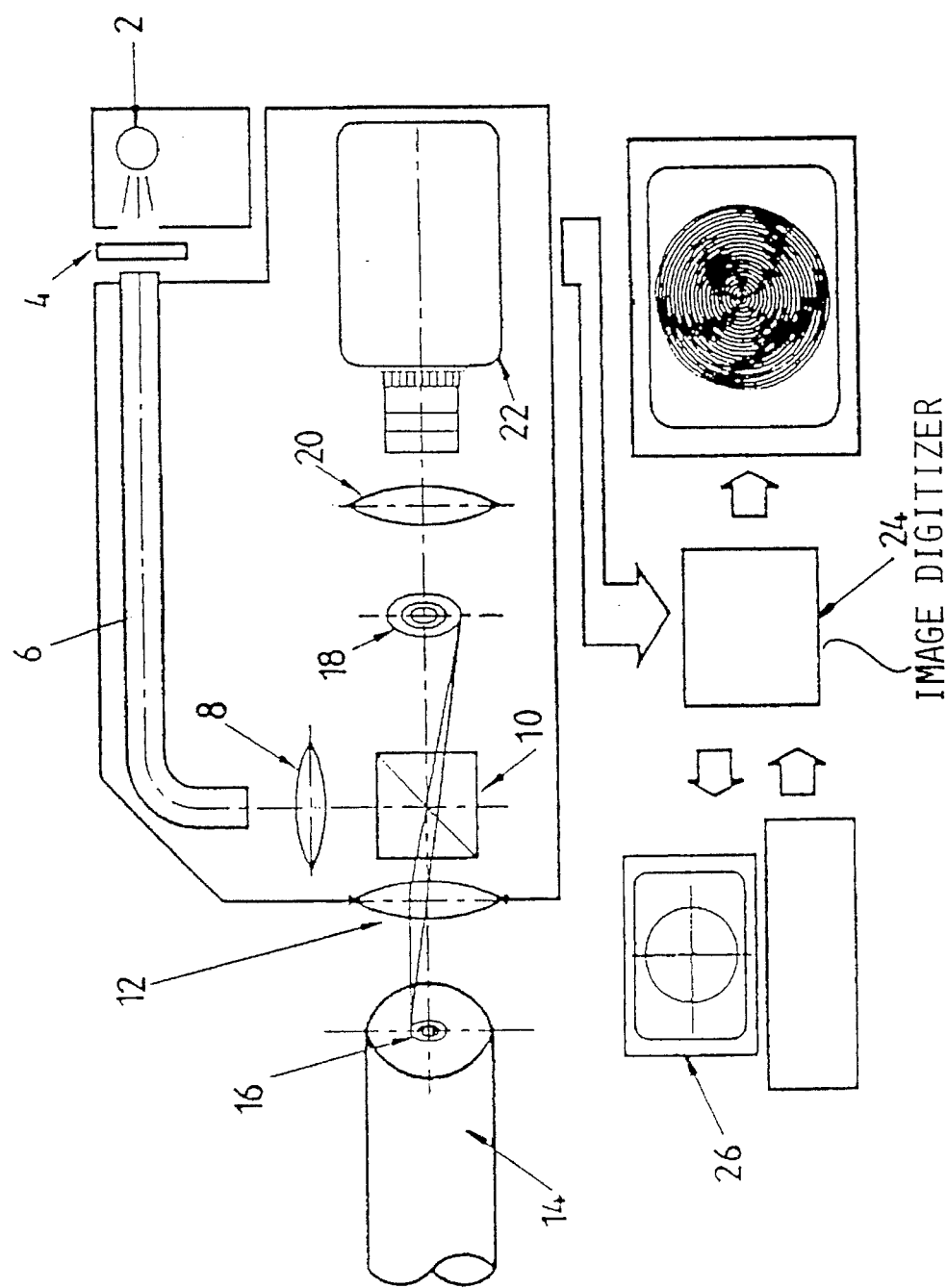
FIG. 4 illustrates a schematic view of an apparatus for measuring two- dimensional displacement by moire fringes.

The optical apparatus used for obtaining actual moire fringes from two concentric circle gratings is configured as in FIG. 4. A moving grating 16 and a standard grating 18 are made of quartz-glass on which concentric circles are patterned with a thin film chrome layer by using a Yag-laser lithography process. The standard grating has 99 concentric circles of 24 μm pitch while the moving grating has 100 concentric circles of 6 μm pitch. A halogen lamp is used as a light course 2 and a heat absorbing filter 4 is used to prevent the deformation of the optical system induced by the light source 2. A beam of the light source 2 is transmitted through the heat absorbing filter 4 to an optical fiber 6. The beam from the optical fiber 6 is condensed by a condensing lens 8. The condensed beam is reflected by a beam splitter 10 by 90° to shine on the moving grating 16 of a moving body 14 though a microscope objective lens 12. A real image of the moving grating 16 having the same magnitude as the standard grating 18 is subsequently formed on the standard grating 18 through the microscope objective lens 12. The center of the standard grating 18 is established as the origin for measuring two- dimensional displacement. An overlapped virtual image of the moving grating 16 and the standard grating 18 is captured by a high speed 512×512 CCD camera 22 through a microscope eyepiece 20 and is quantized into 8 bits by an image digitizer 24 and then inputted into a personal computer 26. The eccentric magnitude and direction of the moving grating 16 is calculated by the personal computer 26.

Figure 5:
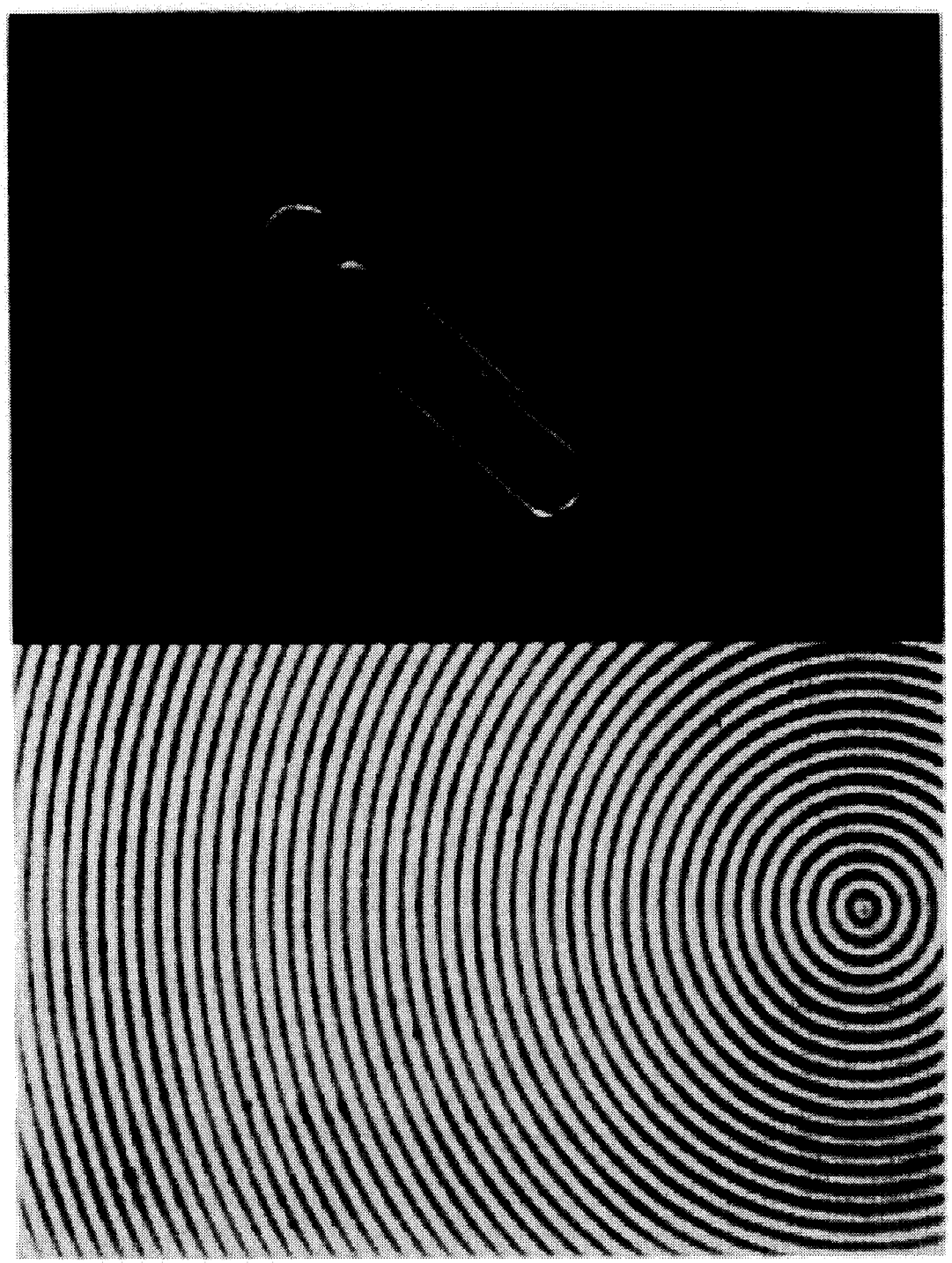
FIG. 5 is a photograph of an actual size of a moving grating.
Figure 6A:
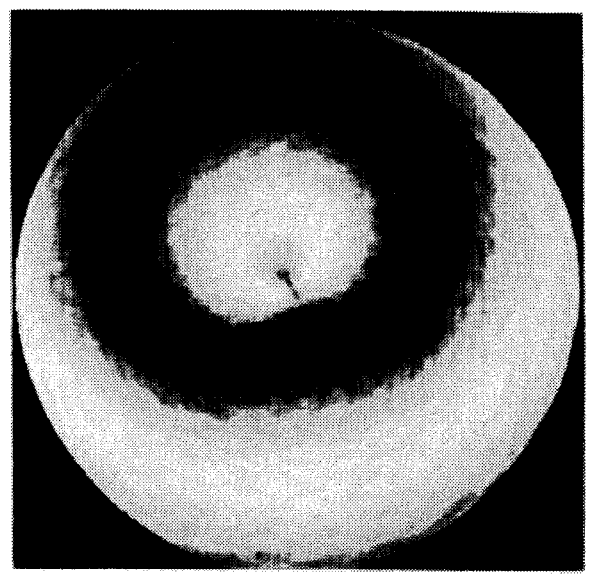
FIGS. 6A–6C are photographs of patterns of moire fringes captured by CCD camera.
Figure 6B:
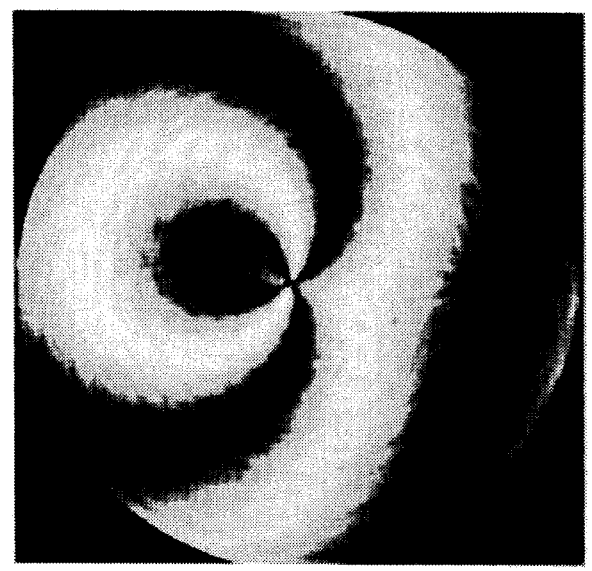
Figure 6C:
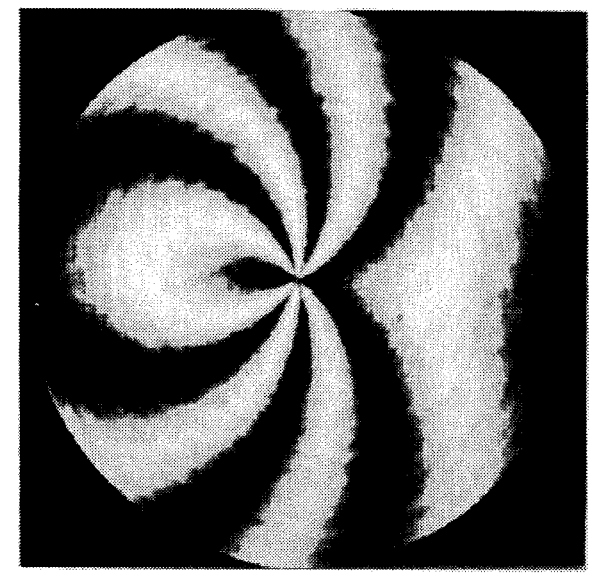
Figure 7A:
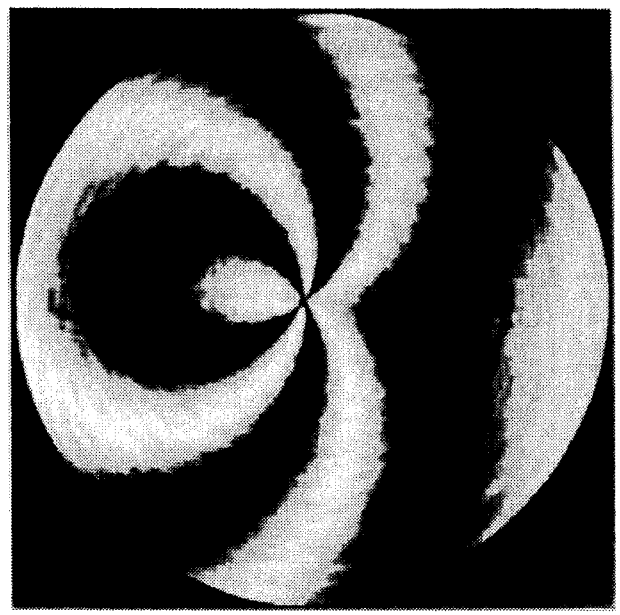
FIG. 7A is a photograph of moire fringes captured by CCD camera.

FIG. 5 illustrates a photograph of an actual size of a moving grating. FIG. 6 shows some exemplary raw images of captured moire fringes. Referring to FIGS. 6A–6C, as concentric circles increase in number, the pattern of concentric circles disappears, but the pattern of moire fringes appears. The pattern of moire fringes shown by FIG. 7A is a harmonic function of one period from $r_o=0$ to $r_o=1$ in Eq. 7. Therefore, when the intensity of the beam is sampled in the equivalent space from $r_o=0$ to $r_o=1$ for an arbitrary parameter θ, the wrapped radial phase $\psi_w(\theta)$ can be expressed as $$\psi_w(\theta) = \tan^{-1} \frac{\sum_{i=0}^{n-1} I\left(\frac{iR}{n}, \theta\right) \sin\frac{2\pi i}{n}}{\sum_{i=0}^{n-1} I\left(\frac{iR}{n}, \theta\right) \cos\frac{2\pi i}{n}} \quad (12)$$

The wrapped radial phase $\psi_w(\theta)$ obtained from the above equation becomes constrained within the range of $-\pi$ to $\pi$ to the arctangent operation, and should be unwrapped by adding an appropriate phase shift in the manner of $$\psi(\theta) = 2\pi m + \psi_w(\theta) \quad (13)$$

Figure 7C:
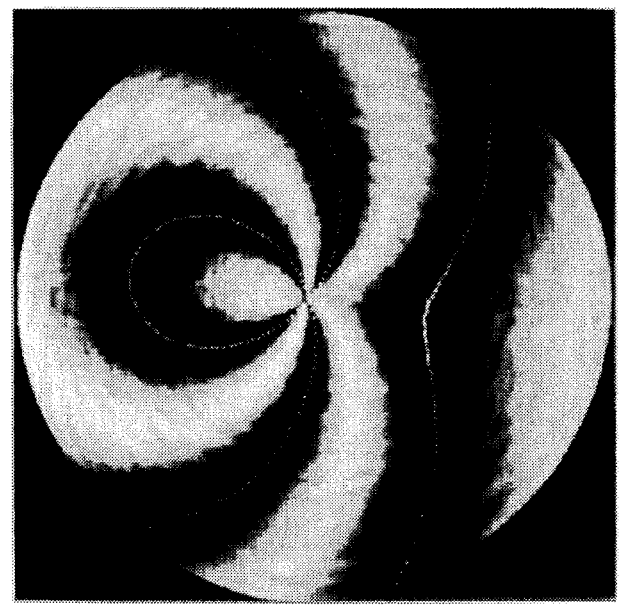
FIG. 7C is a photograph illustrating a moire fringe skeleton (i.e., the darkest point) shown by FIG. 7A.
Figure 7B:
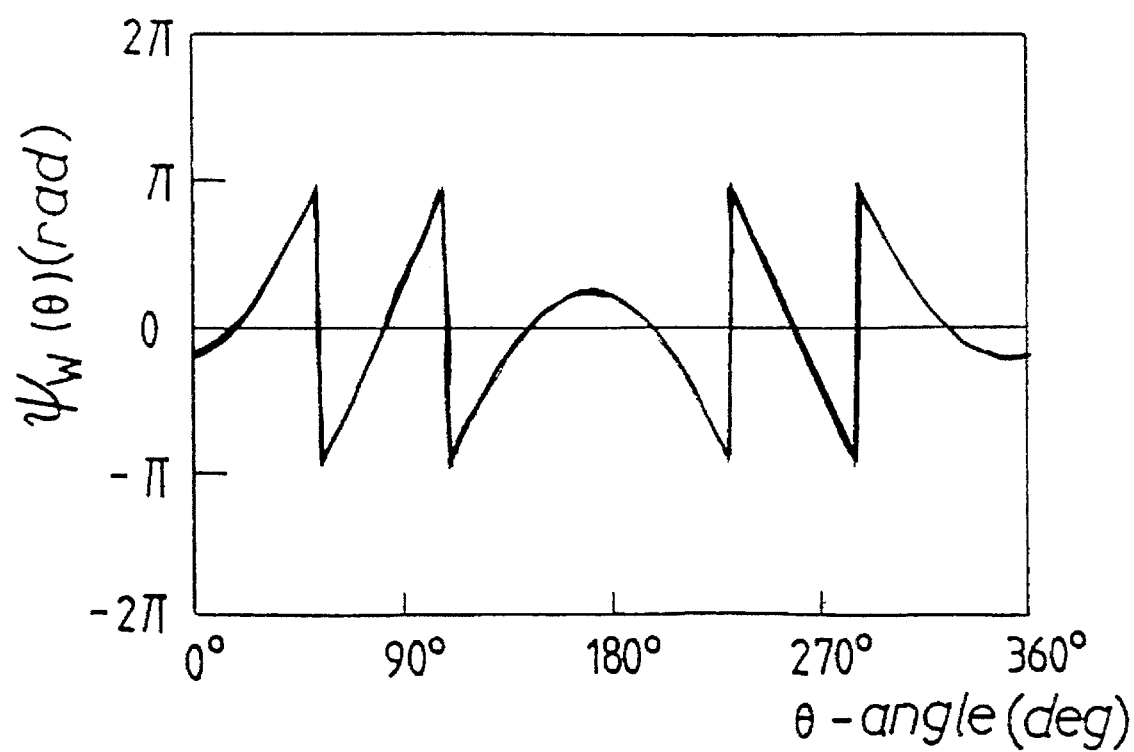
FIG. 7B is a graph illustrating the distribution of wrapped radial phases for the moire fringes shown by FIG. 7A.
Figure 7D:
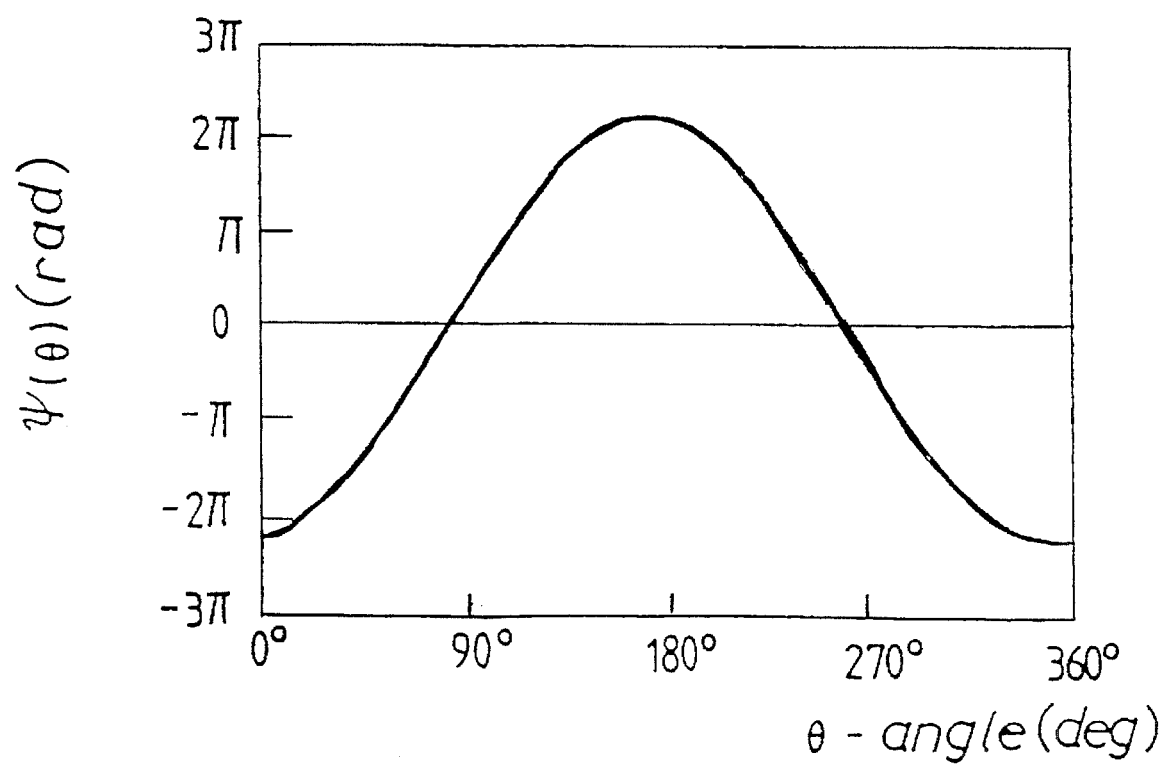
FIG. 7D is a graph illustrating the distribution of unwrapped radial phases for the moire fringes shown by FIG. 7A.

Mathematically, the integer m is decided such that $\psi(\theta)$ should be continuous all along $\theta(0<\theta<2\pi)$ with the zero mean. FIG. 7C shows a center of moire fringes (that is, the darkest points) obtained from Eq. 10, Eq. 12 and Eq. 13. FIG. 7D shows the radial phase $\psi(\theta)$ obtained from Eq. 13. Therefore, the eccentric direction $\phi$ and eccentric magnitude $\epsilon$ is determined from Eq. 8 as $$\phi = \tan^{-1} \frac{\sum_{i=0}^{n-1} \psi\left(\frac{2\pi i}{n}\right) \sin\frac{2\pi i}{n}}{\sum_{i=0}^{n-1} \psi\left(\frac{2\pi i}{n}\right) \cos\frac{2\pi i}{n}} \quad (14)$$

and $$\epsilon = \frac{R}{\pi N n} \left[ \left( \sum_{i=0}^{n-1} \psi\left(\frac{2\pi i}{n}\right) \cos\frac{2\pi i}{n} \right)^2 + \left( \sum_{i=0}^{n-1} \psi\left(\frac{2\pi i}{n}\right) \sin\frac{2\pi i}{n} \right)^2 \right]^{1/2} \quad (15)$$

Figure 8:
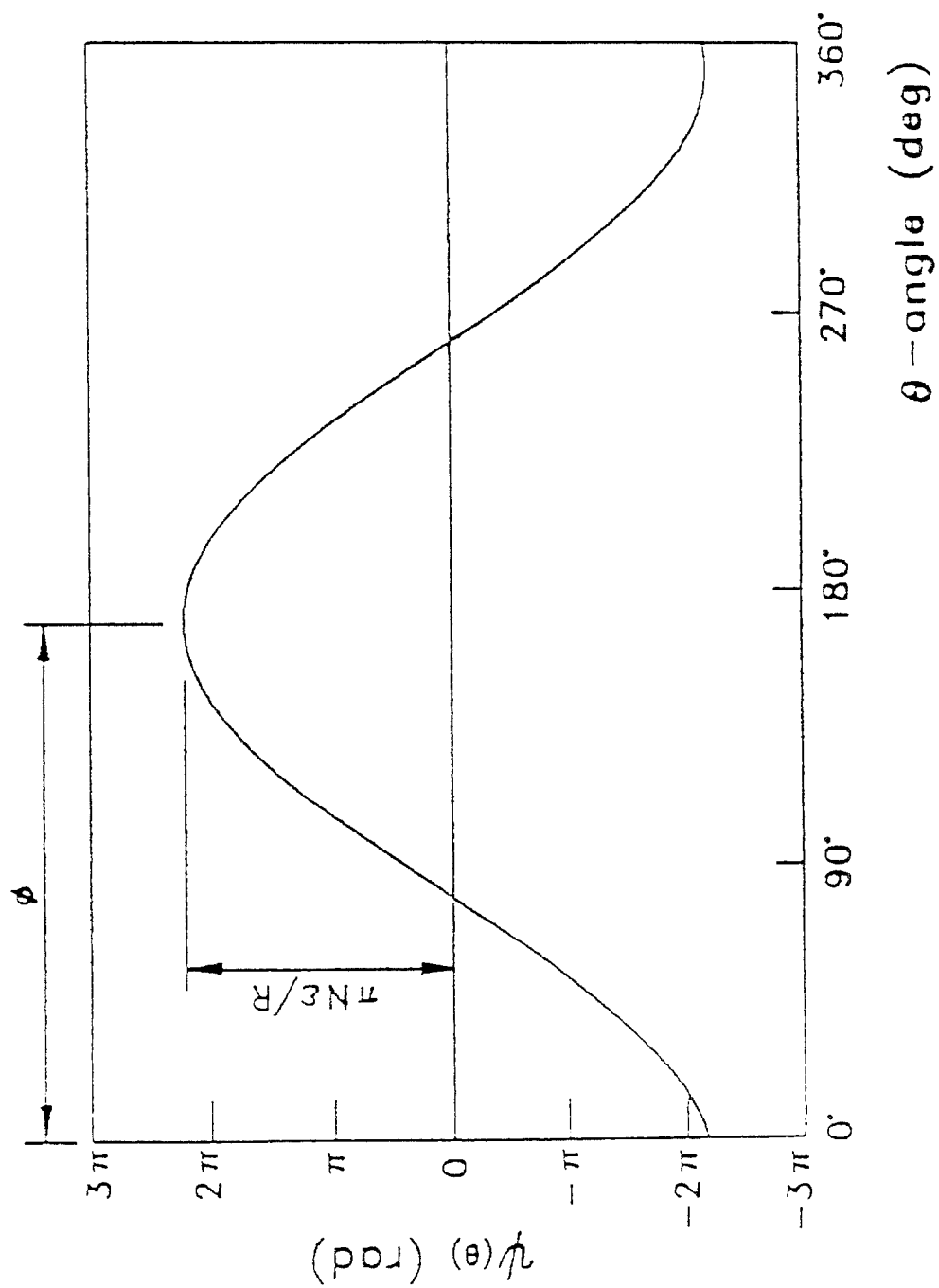
FIG. 8 is a graph illustrating a determination method of an eccentric magnitude and an acentric direction of a moving grating from the radial phase distribution shown by FIG. 7D.
Figure 9:
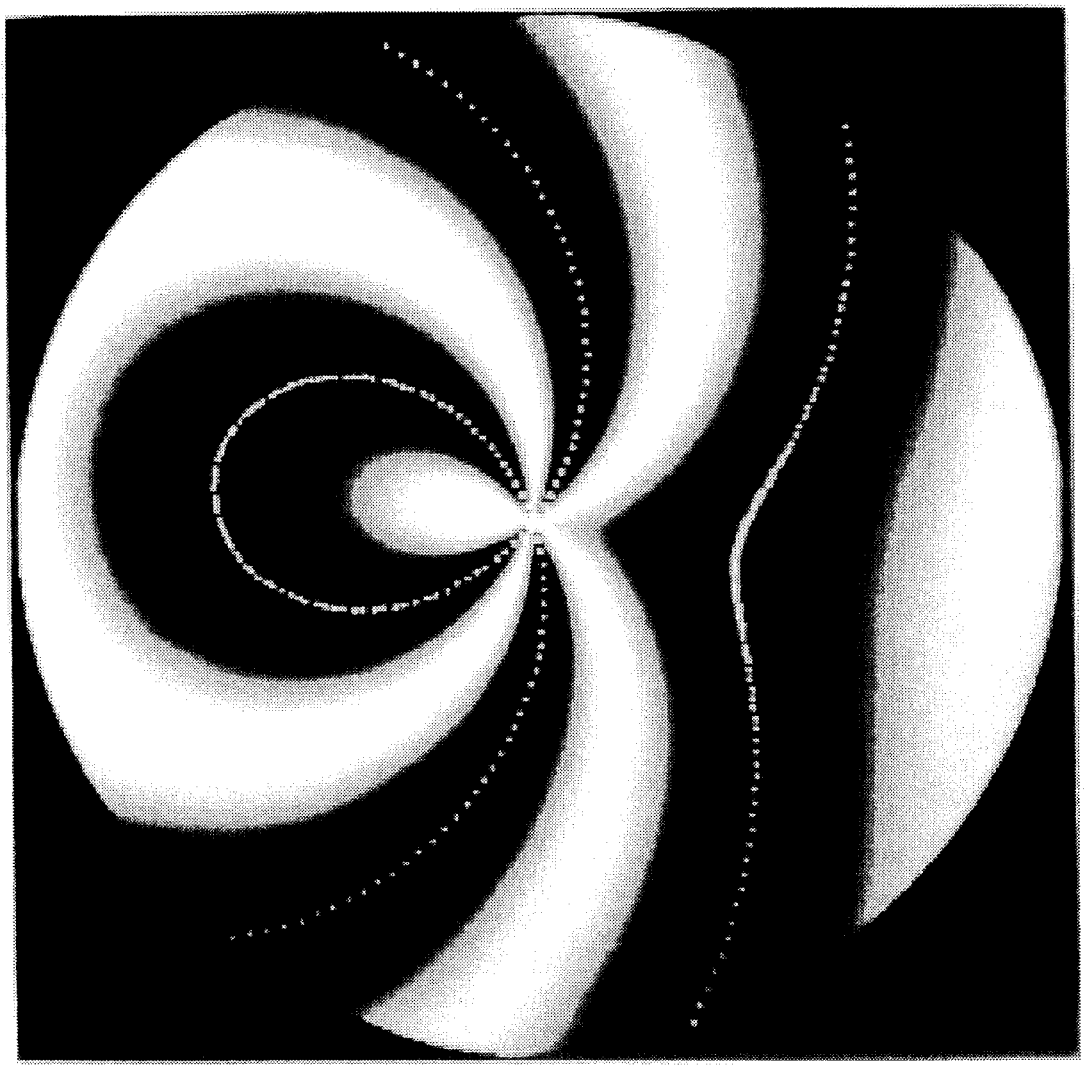
FIG. 9 illustrates a plane view of a reconstructed image of pure moire fringes and its skeleton by using an eccentric magnitude and an eccentric direction of a moving grating obtained by FIG. 8.

FIG. 8 and FIG. 9 show the distribution of the radial phase and the pattern of the moire fringes reconstructed by the θ and ε which is obtained from Eq. 14 and Eq. 15.

Figure 10:
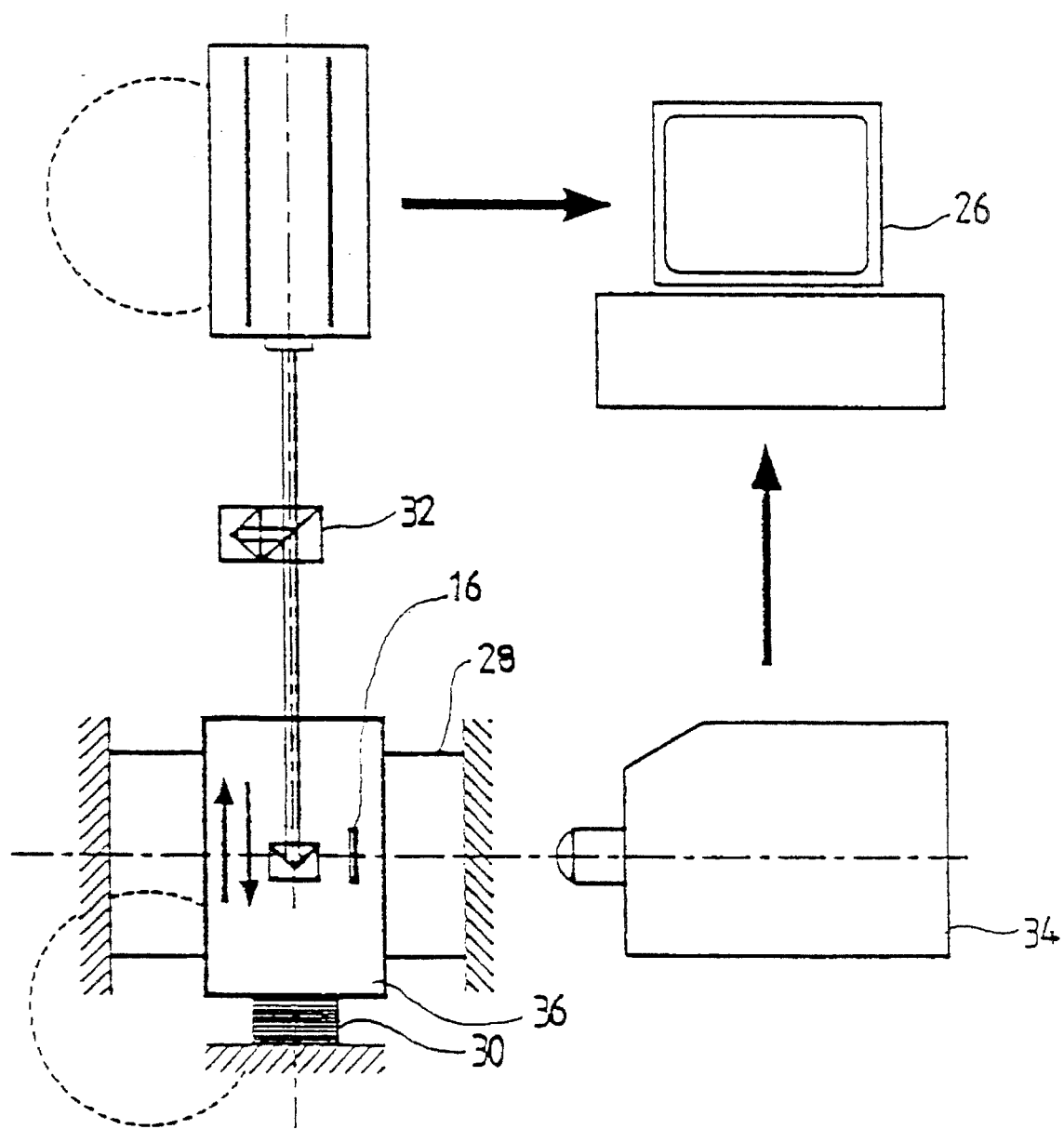
FIG. 10 illustrates a schematic view of a calibration system for evaluating the measuring accuracy of the apparatus for measuring two- dimensional displacement shown by FIG. 4.

The moire fringes according to minute two- dimensional displacement is captured by a measuring system shown in FIG. 10 that inspects the theoretical analysis of the moire fringes and evaluates the accurate pitch of the moving grating. Also, the two- dimensional displacement by the above theoretical analysis can be experimentally compared with the actual two- dimensional displacement obtained from the measuring system shown in FIG. 10. A table 36 is constrained by pairs of leaf springs 28 in a designated transitory direction. A piezoelectric actuator 30 pushes the table 36 under the control of the personal computer 26 and its actual movement is measured by a laser interferometer 32. So, the moving grating 16 placed on the table 36 moves 15 μm to 0.5 μm span and the two- dimensional displacement for each span is measured by the laser interferometer 32.

Figure 11:
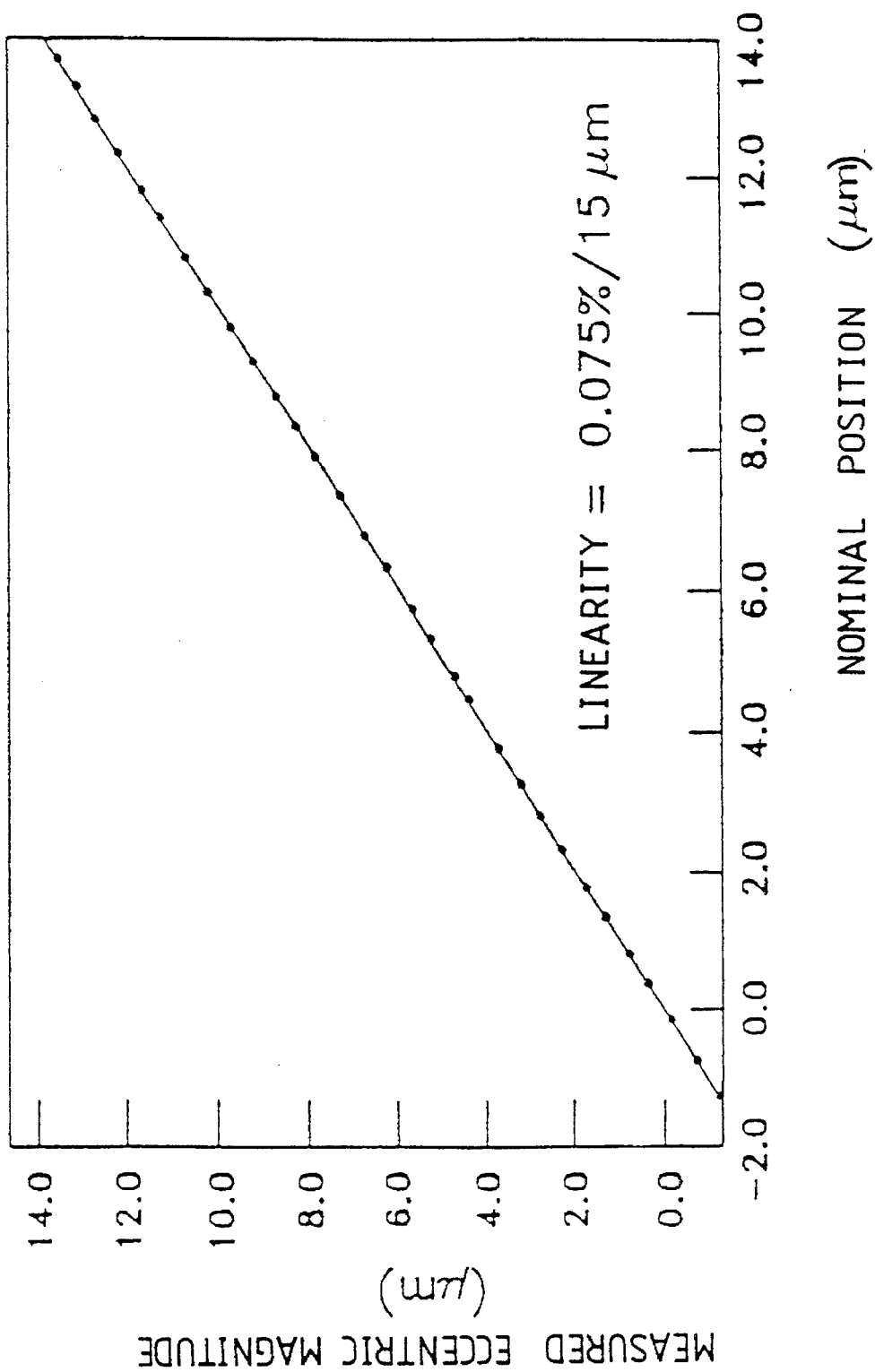
FIG. 11 is a graph illustrating a linear experimental result of eccentric magnitude.

Referring also to FIG. 11, the values of eccentric magnitude measured by a measuring apparatus 34 are plotted against the nominal position of the table 36 taken from the laser interferometer 32. The result shows a measuring linearity of 0.075% over the full calibration length of 15 μm. Also, the sensitivity of the measuring system is 0.9857 rad/μm. Therefore, the actual pitch of the moving grating is 6.3743 μm by $$\text{Sensitivity} = \frac{2\pi}{P_2} \text{ (rad/μm)} \quad (16)$$

Figure 12:
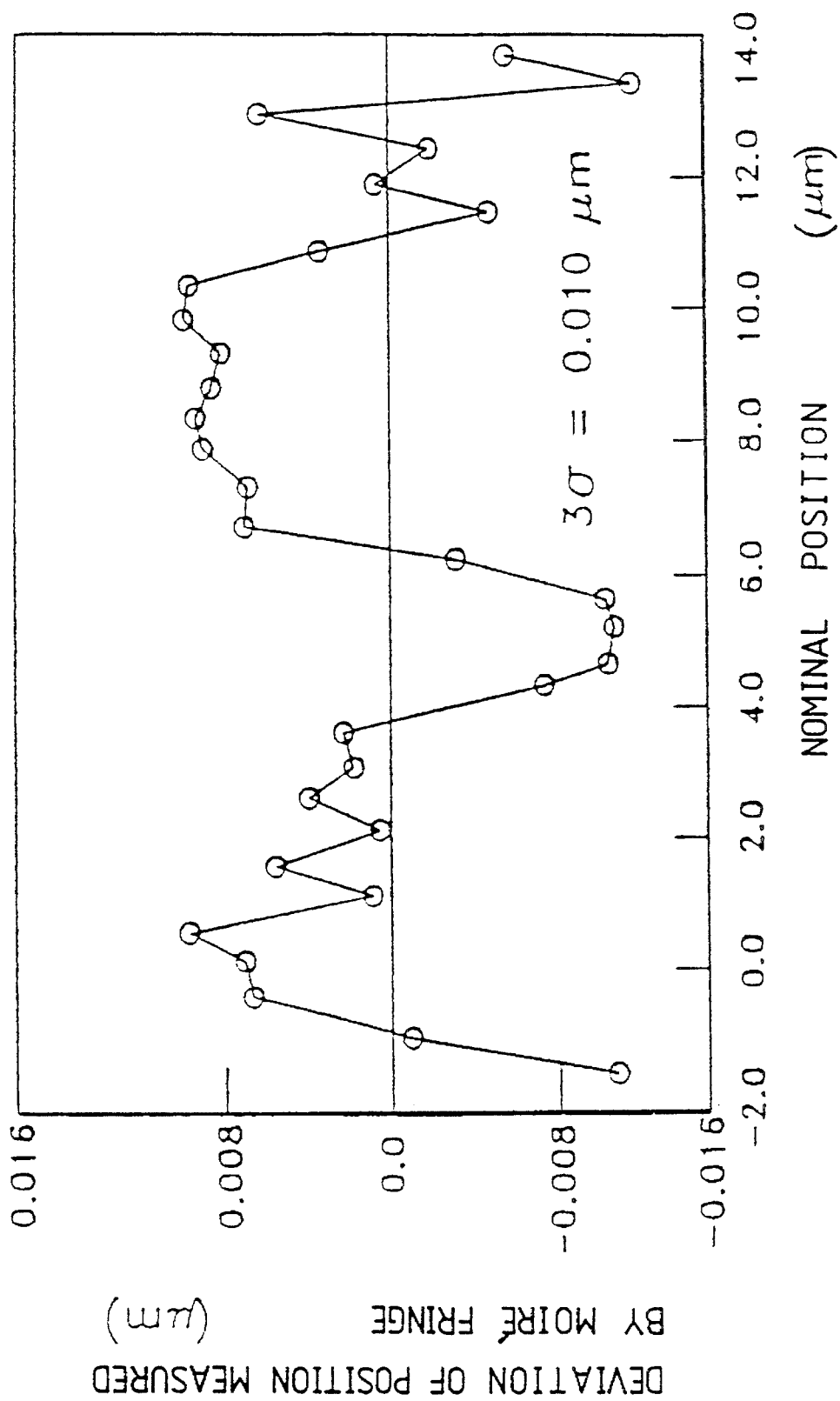
FIG. 12 is a graph illustrating an experimental result for deviation errors of measured positions.
Figure 13:
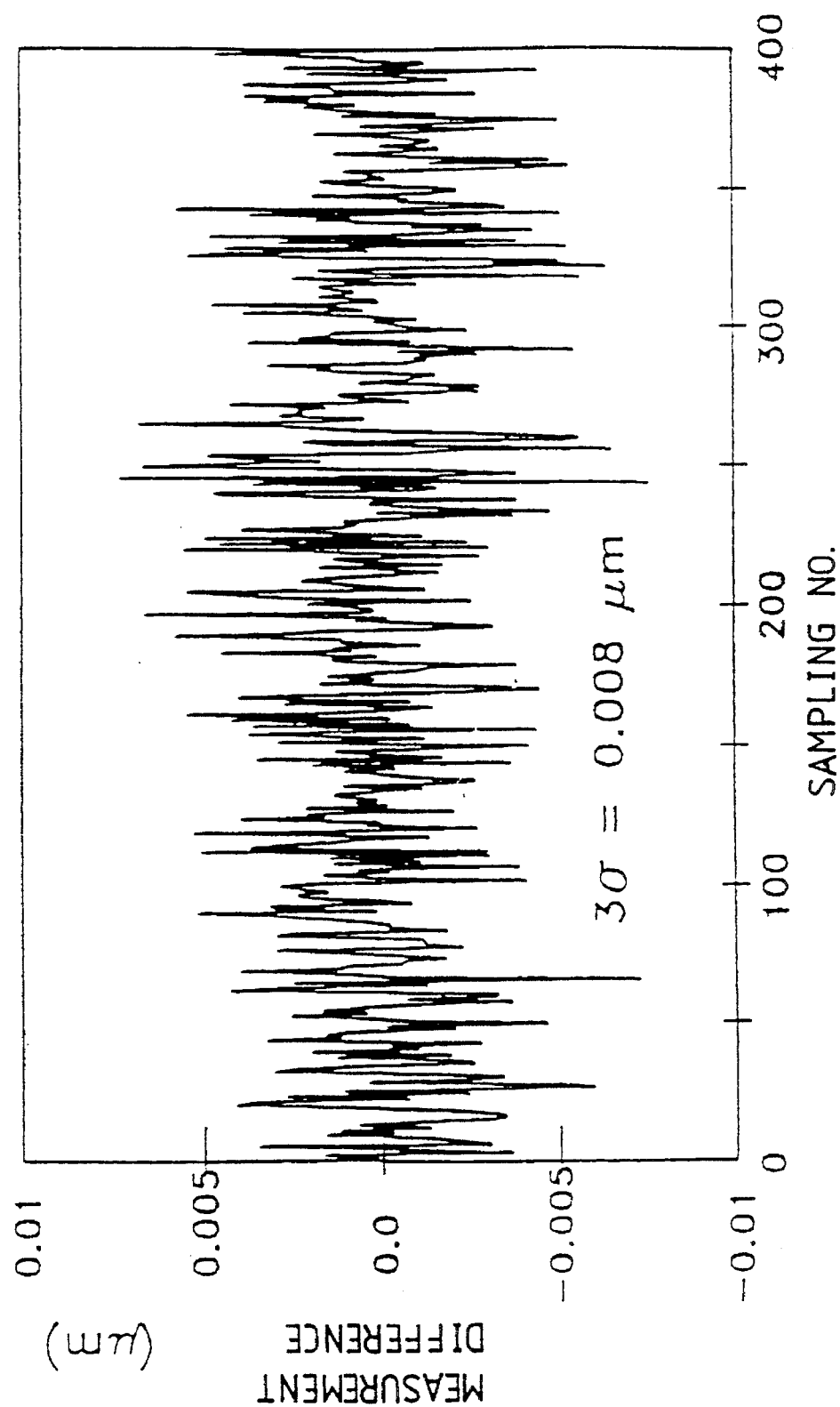
FIG. 13 is a graph illustrating an experimental result for the repeating accuracy of the measurements.

Deviation errors are calculated by the personal computer 26 of which 3δ uncertainty dispersion reveals about 0.01 μm as shown in FIG. 12. Finally, the measurement repeatability of the measuring system is given in FIG. 13 which is about ±0.005 μm over 400 consecutive sampling measurements.

While deviation error is about 0.1 μm when one-dimensional plane displacement is measured by the optical linear scale, deviation error in the present invention is less than 0.1 μm. The experimental results demonstrate that a measuring accuracy is 0.01 μm without significant disturbances of electromagnetic noises. This high resolution in the present invention can be obtained since various noises are filtered through two times, that is, the radial phase of one periodic component by using Eq. 12 is obtained from $r_o=0$ to $r_o=1$, and then the radial phase and amplitude of one periodic component by using Eq. 14 and Eq. 15 are calculated from θ=0° to θ=360° in the analytic process.

The present invention has the benefits that two-dimensional displacement can be measured by a pair of gratings and the measurement resolution can be improved by the image processing using the characteristics of moire fringes.

What is claimed is:

1. An apparatus for measuring two-dimensional displacement by moire fringes of concentric circle gratings, comprising:

a light source generating a light beam;

a heat absorbing filter absorbing heat of the light beam;

an optical fiber transmitting the light beam from the heat absorbing filter;

a condensing lens condensing the light beam from the optical fiber;

a beam spliter reflecting the light beam from the condensing lens to change a path of the of the light beam by 90°;

a microscope objective lens condensing the light beam from the beam splitter;

a moving grating attached to a moving body being shone by the light beam from the microscope objective lens;

a standard grating on which is formed a real image of the moving grating by a microscope lens and that forms a pattern of moire fringes from the real image of the moving grating; and a photographing means for capturing a virtual image of the moving grating and the standard grating.

2. A method for measuring two-dimensional displacement by moire fringe of concentric circle gratings, comprising the steps of:

absorbing heat from a beam of a light source using a heat absorbing filter, and thereafter transmitting the beam through an optical fiber;

condensing the beam from the optical fiber and thereafter transmitting the beam through a beam spliter to be reflected onto a microscope objective lens;

shining the beam through the microscope objective lens and onto a moving grating attached to a moving body; and forming an image of the moving grating onto a standard grating through a microscope objective lens, and capturing an overlapped virtual image of the moving grating and the standard grating using a camera.

* * * * *